Patented Nov. 11, 1941

2,262,728

UNITED STATES PATENT OFFICE

2,262,728

BONDED ABRASIVE

Robert C. Swain, Riverside, and Donald W. Light, Old Greenwich, Conn., assignors to American Cyanamid Company, New York, N. Y., a corporation of Maine No Drawing. Application September 14, 1940, Serial No. 356,826

10 Claims. (Cl. 51—298)

This invention relates to abrasive articles and compositions of the type in which a finely divided abrasive material is cemented together or to a backing by a resinous bonding material. An object of the invention is to provide abrasive articles of this class having higher heat-resistance and better mechanical strength. A further object is the provision of a novel class of binders for molded abrasive articles which will wet the abrasive particles and therefore give a strong bond without the use of extreme molding pressures. Still further objects will become apparent from the following description, when taken with the claims appended thereto.

We have found that an improved class of bonded abrasive articles is obtained when binders containing aminotriazine-aldehyde resins such as melamine resins are used in admixture with phenol-formaldehyde type resins. Bonded abrasives containing blends of aminotriazine-aldehyde resins with phenolic resins are extremely heat-resistant; the bond does not weaken at the high temperatures encountered in high-speed grinding but remains strong and durable and gives a long effective life to the abrasive article.

In addition to their heat-resistance, the aminotriazine resins also enhance the hardness and stability of the phenolic resins, and therefore give a strong bond to molded abrasive articles. Moreover, the presence of an aminotriazine-aldehyde resin in admixture with phenol-formaldehyde resins results in a composition that cures much more rapidly and completely in short periods of time, and which can therefore be manufactured cheaply and readily by standard molding procedures.

The broad principles of our invention are not limited to any single aminotriazine-aldehyde condensation product, and any resinophoric material of this class may be used if desired. However, the condensation products of melamine and its derivatives such as 2.4.6 triethyl and triphenyl triamino 1.3.5 triazines, 2.4.6 trihydrazino 1.3.5 triazine and the corresponding condensed triazines such as melam and melem appear at the present time to be of greatest immediate commercial importance, by reason of the availability of melamine and its derivatives from dicyandiamide or cyanuric chloride as raw materials, and for this reason abrasive compositions containing these classes of materials constitute preferred embodiments of the invention. On the other hand, triazines containing one or two reactive amino groups such as ammeline, ammelide, formoguanamine, 2 amino 1.3.5 triazine and their substitution products as well as nuclear substituted aminotriazines such as 2 chloro-4.6 diamino 1.3.5 triazine, 2 phenyl 4 amino 6 hydroxy 1.3.5 triazine, and azine, 6 methyl 2.4 diamino 1.3.5 triazine and the like can be condensed with lower or higher aliphatic, aromatic or heterocyclic aldehydes to produce heat-resistant binders for abrasives and such condensation products are therefore included in the invention in its broader aspects.

Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce resins suitable for use in the manufacture of bonded abrasives in accordance with the principles of the invention.

The condensation between the aminotriazine and the aldehyde may take place under acid, neutral or alkaline conditions, and in the presence or absence of a solvent for the incompletely polymerized reaction products which are first formed. These condensation products may be prepared by any suitable process and in any desired combining ratio of aldehyde to aminotriazine from 1:1 up to and including 6:1. Representative methods of preparation will be described in the examples which are to follow.

The blends of aminotriazine-aldehyde resin and phenol-aldehyde resin may be prepared by any one of several processes such as are illustrated in the following examples. Thus, for example, mixtures of phenol and melamine having any desired ratio may be reacted with formaldehyde solutions such as commercial 37% formalin solutions, preferably under alkaline conditions, and the resulting resin syrups may be dehydrated by vacuum distillation in the usual manner. In some cases, as in the preparation of sandpaper, emery paper and the like, the extent of dehydration may be reduced and the aqueous syrup may be used directly as a binder for the abrasive. Alternatively, aminotriazine-aldehyde resins may be mixed with phenol-aldehyde resins, with or without the addition of the solvents or softening agents, and the resulting binder can then be spread over the abrasive by mechanical mixing.

Mixtures of granular abrasive material such as abrasive alumina, carborundum, diamond, etc. with the bonding agents of the present invention may be cured by ordinary molding procedures, either with or without the addition of curing agents. Thus, for example, the mixtures may be cured by the action of heat and pressure by employing an acid curing agent such as phthalic acid, oxalic acid, or similar acid curing agents, and it is an advantage of the invention that the mixed aminotriazine-phenol-formaldehyde resin can be cured by this method in a much shorter time than the corresponding phenol-formaldehyde resins prepared from similar classes of material. However, abrasive articles may also be shaped by pressure alone followed by baking at 90–125° C. or higher, and in this case it is possible to obtain a highly satisfactory bond without the addition of any curing agent whatsoever.

The invention will be illustrated in greater detail by the following specific examples. It should be understood, however, that although these examples describe certain of the more specific features of the invention they are given primarily for purposes of illustration, and that the invention in its broader aspects is not limited thereto.

*Example 1*

A blended melamine-phenol resin was prepared by refluxing a mixture of 3 moles of phenol and 2 moles of melamine with 11 moles of 37% aqueous formaldehyde solution for about one hour, after adjusting the alkalinity of the solution to a pH of 9.1 by addition of sodium carbonate. A vacuum of about 21 inches was then applied and the solution was dehydrated by vacuum evaporation of the water for about one hour. Acid was then added to bring the pH to about 7.3 and dehydration was continued for about 1¼ hours longer until a sample was hard and brittle on cooling. The product was then cooled and ground to 200–300 mesh particle size.

1000 parts of "Aloxite" grits, a commercial form of abrasive alumina, were moistened with a mixture of 15 parts of furfural and 15 parts of monoethyl ether of ethylene glycol and then intimately mixed with 100 parts by weight of the pulverized synthetic resin. The mixture was made uniform by blending for about 20 minutes in a mechanical mixer and the product was then heated for about 50 minutes at 60° C. until it was fairly dry but somewhat tacky. Abrasive whetstone blocks were cold molded from this mixture at about 900 pounds per sq. in. for 3 minutes and were then cured for 5 hours by heating in an oven at 100° C.

*Example 2*

Instead of preparing the resin mixture by simultaneous reaction with formaldehyde as in Example 1, it is equally feasible to employ mixtures of phenol-aldehyde resins and aminotriazine-aldehyde resins in any desired proportion. This is true by reason of the fact that these two classes of resins are compatible in all proportions, and it is possible to prepare blends containing from 1–99% of the melamine resin, the remainder being phenol-aldehyde resin or mixtures of phenol-aldehyde resin with plasticizers, curing agents and the like.

An acid-reacted phenol-aldehyde resin was prepared by heating 965 parts by weight of phenol and 770 parts of 37% aqueous formaldehyde solution after addition of 5.6 parts of sulphuric acid in 150 parts of water. The heating was continued for about 45 minutes at 96–100° C., after which a 21 inch vacuum was applied and the resin dehydrated at about the same temperature range for 1½ hours, or until a sample was hard and brittle on cooling. The product was then cooled and ground.

An aminotriazine-formaldehyde resin was prepared by reacting 1 mole of melamine with 3 moles of 37% aqueous formaldehyde solution at 60° C., applying a vacuum, and evaporating the water until a hard, brittle product was obtained. This product was also ground to 200–300 mesh.

1000 parts by weight of "Aloxite" were moistened as in Example 1 and 80 parts of the phenolic resin and 20 parts of the melamine resin were added. The batch was then mixed in a Werner-Pfleiderer mixer for about 20 minutes to insure uniformity, after which it was heated for about 50 minutes at 60° C. Whetstone blocks weighing about 200 g. were then cold molded from the mixture as in Example 1 and were cured for 5 hours at 100° C. The blocks were found to have excellent abrasive characteristics and the resin bond was stable against continued heating for long periods of time.

*Example 3*

1000 parts of "Aloxite" grits were moistened as in previous examples and 20 parts of the phenolic resin and 80 parts of the melamine resin of Example 2 were added. The mixture was blended for 20 minutes as before, heated for about 50 minutes at 60° C., and molded into blocks and cured at 100° C. in the usual manner. The product was even harder than the product of Example 2, showing the effect of the increased proportion of melamine resin, and possessed excellent abrasive properties.

*Example 4*

23.6 parts by weight of dicyandiamide and 26.4 parts of 82% phenol were heated and refluxed at atmospheric pressure with continuous agitation for about 4 hours. Shortly after the heating was begun an evolution of ammonia was noted, and a total of about 0.15 mole of ammonia for each mole of dicyandiamide was given off during the heating period. The mixture was then cooled to below 100° C.

60.8 parts of 37.5% formaldehyde solution were neutralized by the addition of sodium carbonate solution to a pH of 9.0 to 9.5, and preferably to about 9.1 and this solution was then added to the cooled reaction mixture. The formaldehyde condensation was carried out by refluxing the mixture at 96–98° C. for about ½ hour. The resulting product was a solution containing, in addition to the phenolic resin, a resin consisting of the formaldehyde reaction product of melamine, melamine deamination products, a small amount of unconverted dicyandiamide, and probably some intermediate conversion products of unknown constitution.

A portion of this solution was diluted with isopropanol to about 45% solids. 3.2 parts of this resin solution were intimately mixed with 7.8 parts by weight of fine "Aloxite" abrasive and the mixture was spread on heavy kraft paper and cured for 3½ hours at 80–85° C. A sandpaper was obtained having good adhesive and abrasive properties.

*Example 5*

Another portion of the resin solution of Example 4 was mixed with 17% of urea. The mixture was stirred and diluted with isopropanol to a thick paste. 5.4 parts of this paste and 13 parts of finely divided silica were spread on heavy kraft paper and cured for 3½ hours at 80–85° C. A sandpaper having an even better bond between the abrasive and the paper than that of Example 4 was obtained.

*Example 6*

Casein was swollen overnight with water and dissolved by the addition of ammonium hydroxide to a clear solution containing 7.5% solids. Another portion of the resin solution described in Example 4 was poured into this casein solution with vigorous agitation to form an emulsion consisting of 71.5% of the resin solution and 28.5% of the casein solution. 4 parts of this emulsion were mixed with 11.7 parts of finely divided "Aloxite" and the mixture was spread on heavy kraft paper and cured by heating for 3½ hours at 80–85° C. The results obtained in this example indicate that the resin can be admixed with the abrasive and applied to a paper or cloth backing in the form of an aqueous emulsion instead of in solution if desired.

Example 7

2 moles of melamine and 6 moles of 37% aqueous formaldehyde solution were made alkaline with half normal sodium hydroxide solution and heated to 80° C. with agitation. When the melamine was all dissolved the solution was filtered and refluxed for ½ hour, after which an additional 3 moles of phenol and 2 cc. of half normal sodium hydroxide were added. The melamine was again refluxed for an additional one hour period, after which 3 moles of aqueous formaldehyde solution were added together with 5 cc. of half normal sodium hydroxide solution. The refluxing was then continued for an additional ½ hour period when a clear solution was obtained.

A sample of this solution, which was found to contain 70% solids, was vacuum dehydrated to 60% solids and was used for the preparation of sandpaper as in Example 4.

Example 8

240 parts by weight of 37.5% formaldehyde solution are neutralized by the addition of about 7 parts of half normal sodium hydroxide solution until a pH of 9.0–9.1 is obtained. 126 parts of melamine and 115 parts of 82% phenol are then added and the mixture is warmed to 60° C. and held at this temperature until the melamine dissolves. Activated carbon and diatomaceous earth are stirred in and the solution is filtered. The clarified solution is refluxed at 96° C. for one hour and is then dehydrated by evaporation of water under a 21 inch vacuum. Upon cooling a hard, brittle resin is obtained which is ground to 150–300 mesh.

100 parts of the ground resin were mixed with 1.75 parts of phthalic acid, oxalic acid, or similar acid curing agent, suitable amounts of zinc stearate or other lubricant and 400 parts of abrasive alumina of 100 mesh size. The mixture was molded under the conditions outlined in Example 1, and excellent abrasive blocks were obtained.

In the foregoing example the phenol may be substituted, in whole or in part, by meta-cresol, para cresol, or mixtures thereof when a cheaper binder and a softer flow in the mold are desired. Xylenols such as 1.2.4-xylenol and 1.3.5-xylenol may also be included in amounts up to about 50% of the total phenol or cresol used, if desired.

This application is a continuation-in-part of our copending application Serial No. 261,060, filed March 10, 1939, now Patent No. 2,215,380 dated September 17, 1940.

What we claim is:

1. An abrasive article comprising particles of abrasive and a binder cured in contact therewith, said binder containing a phenol-aldehyde resin and an aminotriazine-aldehyde resin.

2. An abrasive article comprising particles of abrasive and a binder cured in contact therewith, said binder containing a phenol-aldehyde resin and a melamine-aldehyde resin.

3. An abrasive article comprising particles of abrasive and a binder cured in contact therewith, said binder containing a phenol-formaldehyde resin and a melamine-formaldehyde resin.

4. An abrasive article comprising particles of abrasive and a binder containing a phenol-aldehyde resin and an aminotriazine-aldehyde resin cured in contact therewith by heating in the presence of an acid curing agent.

5. An abrasive article comprising particles of abrasive and a binder cured in contact therewith, said binder containing the condensation product of an aldehyde with the material obtained upon heating a mixture of dicyandiamide and a phenol with evolution of ammonia.

6. An abrasive article comprising particles of abrasive and a binder cured in contact therewith, said binder containing a resin obtained by condensing formaldehyde with the material obtained upon heating a mixture of dicyandiamide and a phenol with evolution of ammonia, the formaldehyde condensation being carried out at a pH of 9.0–9.5.

7. An abrasive article comprising particles of abrasive and a binder containing a blend of 20–80 parts of a phenol-aldehyde resin and 80–20 parts of an aminotriazine resin.

8. An abrasive article comprising particles of abrasive and a binder containing a blend of 20–80 parts of a phenol-aldehyde resin and 80–20 parts of a melamine-aldehyde resin.

9. An abrasive article comprising particles of abrasive and a binder containing a blend of 20–80 parts of a phenol-formaldehyde resin and 80–20 parts of a melamine-formaldehyde resin.

10. An abrasive article comprising a mixture of abrasive particles and a binder containing an aminotriazine-aldehyde resin and a phenol-aldehyde resin, said mixture being molded by heat and pressure in the presence of an acid curing agent.

ROBERT C. SWAIN.
DONALD W. LIGHT.